US007236599B1

(12) United States Patent
Shi et al.

(10) Patent No.: US 7,236,599 B1
(45) Date of Patent: Jun. 26, 2007

(54) GENERATING SEPARATE ANALOG AUDIO PROGRAMS FROM A DIGITAL LINK

(75) Inventors: Jun Shi, San Jose, CA (US); Animesh Mishra, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/577,399

(22) Filed: May 22, 2000

(51) Int. Cl.
*H04R 5/00* (2006.01)
*H04R 3/00* (2006.01)
*H04B 1/00* (2006.01)
*G06F 17/00* (2006.01)

(52) U.S. Cl. ......................... 381/22; 381/119; 381/111; 700/94

(58) Field of Classification Search .................. 381/22, 381/119, 111; 700/94
See application file for complete search history.

(56) References Cited

U.S. PATENT DOCUMENTS

| | | | | |
|---|---|---|---|---|
| 5,133,081 | A * | 7/1992 | Mayo | 455/18 |
| 5,274,708 | A * | 12/1993 | Fields et al. | 381/1 |
| 5,452,348 | A * | 9/1995 | Adams et al. | 379/202.01 |
| 5,454,348 | A * | 10/1995 | Colwell et al. | 119/72 |
| 5,648,778 | A | 7/1997 | Linz et al. | |
| 5,774,567 | A | 6/1998 | Heyl et al. | |
| 6,104,997 | A * | 8/2000 | Shuholm | 704/500 |
| 6,121,531 | A * | 9/2000 | Kato | 84/610 |
| 6,301,366 | B1 * | 10/2001 | Malcolm et al. | 381/119 |
| 6,438,434 | B1 * | 8/2002 | Kamiya | 700/94 |
| 6,456,978 | B1 * | 9/2002 | Wymore et al. | 704/275 |
| 6,535,528 | B1 * | 3/2003 | Rhodes et al. | 370/517 |
| 6,556,539 | B1 * | 4/2003 | Henderson | 370/217 |

FOREIGN PATENT DOCUMENTS

| | | |
|---|---|---|
| EP | 0 843 252 A2 | 5/1998 |
| JP | 6-224640 | 8/1994 |
| JP | 8-129397 | 5/1996 |
| JP | 8-321745 | 12/1996 |
| JP | 11-202870 | 7/1999 |
| JP | 11-213558 | 8/1999 |
| JP | 11-296167 | 10/1999 |
| WO | WO 99/20006 | 4/1999 |

(Continued)

OTHER PUBLICATIONS

Audio Codec '97 , Component Specification, Revision 2.1, May 22, 1998 . Intel Corporation.*

(Continued)

*Primary Examiner*—Vivian Chin
*Assistant Examiner*—Devona E. Faulk
(74) *Attorney, Agent, or Firm*—Trop, Pruner & Hu, P.C.

(57) ABSTRACT

A codec in a processor-based system handles at least two separate audio programs at the same time. This may be useful, for example, for simultaneously playing one audio program while recording another audio program. A first digital to analog converter pair may be coupled to a first mixer and a second digital to analog converter pair may include a second mixer. Thus, two separate audio programs may be handled at the same time, each by a separate digital to analog converter and mixer.

11 Claims, 3 Drawing Sheets

FOREIGN PATENT DOCUMENTS

| | | | |
|---|---|---|---|
| WO | WO9920006 | * | 4/1999 |

OTHER PUBLICATIONS

Audio Codec 1997, Component Specification, Revision 2.1, May 22, 1988. Intel Corporation.*

Audi Codec 1997, Copmonent Specification, Revision 2.1, May 22, 1998. Intel Corporation.*

*Audio Codec '97 Architectural Overview,* Audio Codec Component Specification, Revision 2.1, May 22, 1998, pp. 13, 26, 35, 47-48, 79-90.

* cited by examiner

GENERATING SEPARATE ANALOG AUDIO PROGRAMS FROM A DIGITAL LINK

BACKGROUND

This invention relates generally to audio codecs for processor-based systems.

An audio codec receives digital audio information, converts it to an analog format and mixes that audio information with other data for play by a processor-based system. Generally, the codec is controlled by an audio controller, also known as an audio accelerator, coupled to a bus. The audio accelerator is in turn controlled by the processor.

Many processor-based systems are now being used for relatively elaborate audio functions. For example, processor-based systems may be used to receive digital radio, television and stereo system signals and to play those signals in a unified system. Digital television signals may be received through a cable or satellite connection. In addition, processor-based systems may be utilized to record digital audio information received from a variety of sources.

Conventional codecs, however, handle one audio program at any one time. For example, the Audio Codec '97 (AC'97) Specification, Revision 2.1, dated May 22, 1998, available from Intel Corporation, describes an audio codec that receives a digital stereo channel pair and converts that pair into an analog stereo channel pair. The term "pair" refers to the two channels conventionally called the left and the right channels in stereo systems. The converted analog stereo channel pair may be mixed with other information in a mixer within the codec. The mixer is also coupled to an analog to digital converter that provides an output from the mixer to the digital link.

The AC'97 codec is amenable to handling only one audio program at a time. It is not amenable, for example, to simultaneously recording and playing a television program.

Thus, there is a need for a codec that supports the increasing demands being placed on processor-based systems for handling more than one audio program at a time.

DETAILED DESCRIPTION

Figure 1:
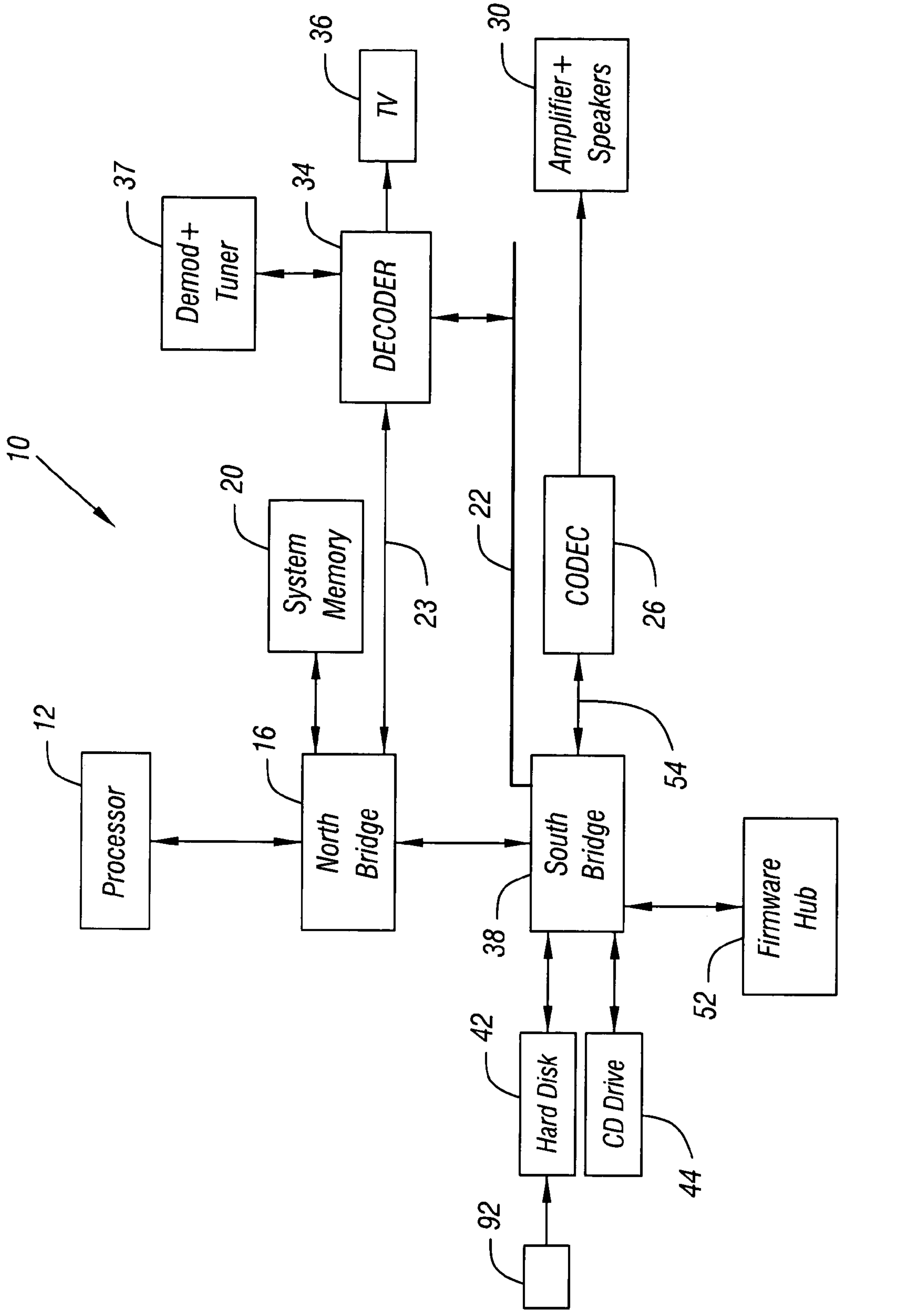
FIG. 1 is a block depiction of a processor-based system, in accordance with one embodiment of the present invention.

A processor-based system 10, shown in FIG. 1, may be a conventional desktop, laptop or handheld computer system or a processor-based web appliance device. In one embodiment of the present invention, the system 10 may be a set-top box in which the display 36 is a television receiver. In fact, the set-top box may sit on top of a conventional television receiver.

In accordance with one embodiment of the present invention, the system 10 may handle more than one audio program at a time. An audio program is a stereo or monaural file that is received over a digital link. The audio program may include voice, music, or television sound, as examples. In some embodiments of the present invention, the system

10 may play one audio program at the same time it is recording another audio program.

The system 10 includes a processor 12 coupled to a north bridge 16. The north bridge 16 couples the system memory 20 and a video and graphics bus 23. The north bridge 16 may include a graphics controller and a memory controller. The bus 22 may be coupled to a decoder 34 that is coupled to the display 36, such as a television receiver or monitor. The decoder 34 may be coupled to a demodulator/tuner 37. The decoder 34 may also include video digital to analog converters and a demultiplexer. The decoder 34 may, for example, decode data compressed according to one of the standards promulgated by the Motion Picture Experts Group, such as for International Organization for Standardisation (Geneva, Switzerland) ISO/TEC 11172 (1993).

One compressed television program may be decoded by the decoder 34 so that uncompressed video data is sent to the south bridge 38 over the bus 22. At the same time another program may be processed by the processor 12 and north bridge 16.

The south bridge 38 forwards the audio data to the coder/decoder or codec 26 through a digital link 54. In accordance with one embodiment of the present invention, the digital link 54 and the codec 26 may be compliant with the AC'97 specification. The codec 26 receives a digital signal over the digital link 54 and provides an analog output to a sound system 30 that includes an amplifier and speakers. The speakers may be a part of a television receiver 36 or other entertainment device.

The south bridge 38 also couples a compact disk player 44 and a hard disk drive 42. In one embodiment of the present invention, the hard disk drive 42 may be utilized to record an audio program. For example, the system 10 may record an audio program on the hard disk drive 42 at the same time the system 10 is playing an audio program received from the compact disk player 44.

Thus, in some embodiments of the present invention, digital audio programs may be received through the demodulator/tuner 37 which may be coupled, for example to a satellite or cable connection. The received data is forwarded to the decoder 34, which separates video, audio and other data streams and sends audio data to the north bridge 16. One of those audio programs may be recorded, for example on the hard disk drive 42 at the same time another audio program is being played over the sound system 30. In some embodiments of the present invention, a third audio program may be handled by the codec 26 at the same time as the other two audio programs.

The south bridge 38 may also couple a firmware hub 52 used for booting the system 10. In one embodiment, the hub 52 may be a nonvolatile memory, such as a flash memory, that also stores information such as channel number, volume settings and the like when the system 10 is powered down.

Figure 2:
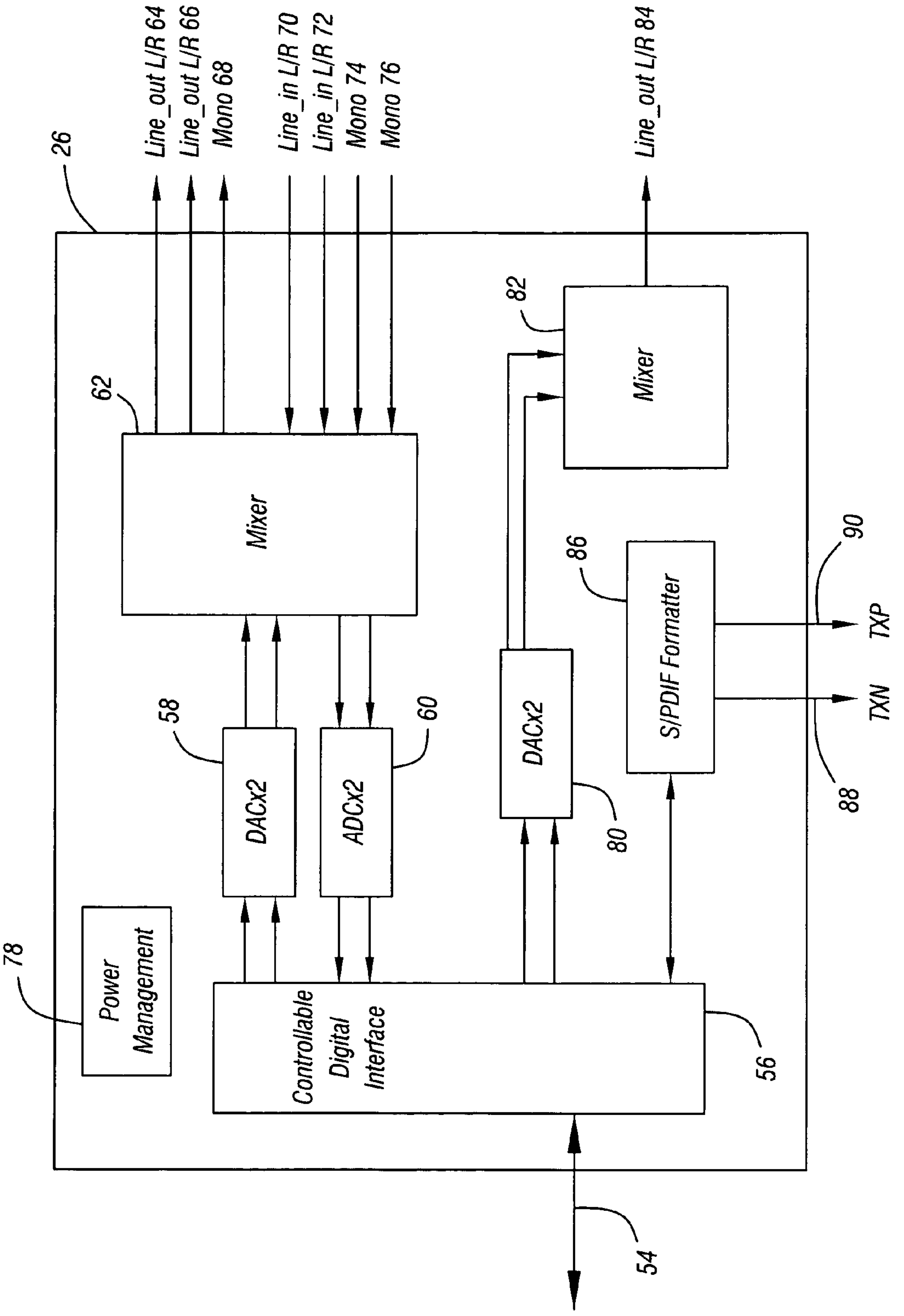
FIG. 2 is a block depiction of the codec of FIG. 1, in accordance with one embodiment of the present invention.

Referring to FIG. 2, the codec 26 receives at least two digital audio programs over the digital link 54. The codec 26 includes a digital interface 56. The digital interface 56 provides a plurality of monaural channels and stereo channel pairs. For example, the digital interface 56 may provide a channel pair to a pair of digital to analog converters 58. Each of the pair of converters 58 may convert one of a left and right stereo channel, in a digital format, to an analog format. A power management module 78 provides power management for the codec 26.

Similarly, the digital interface 56 may include a pair of channels that receive an analog input from an analog to digital converter pair 60. Moreover, the digital interface 56 may provide another channel pair to another pair of digital to analog converters 80. Each of the digital to analog converter pairs 58 and 80 are coupled to a different analog mixer 62 or 82. The mixers 62 and 82 mix the information from the digital to analog converters 58 and 80, respectively, with other information that may be received by the codec 26. In addition, the mixers 62 and 82 may provide audio gain control. A line output 84 is provided for the mixer 82.

Also coupled to the digital interface 56 is a Sony/Phillips digital interconnect format (S/PDIF) formatter 86. The S/PDIF is described in the IEC 60958 (1989) Standard titled, "Digital Audio Interface" (IEC 60958 (1989)) by the International Electrotechnical Commission and available from American National Standards Institute, New York, N.Y. 10036. The formatter 86 may receive an S/PDIF audio program from the digital interface 56 and may provide the program, in appropriate format, to a pair of left and right channels 88 and 90.

The S/PDIF format carries a stereo channel pair with a sampling rate of up to 45 kilosamples per second and a sample precision of up to 24 bits. An S/PDIF physical link uses a biphase Manchester coded stream. Manchester coding combines a data stream, with a clock on a single channel, with up to two transitions on the line for each bit conveyed. There is a line transition at each end of a bit and a central transition if the data is a one. The S/PDIF also carries a subcode that indicates the current track number and current time within the track.

In some cases, the digital link 54 may provide data faster than the formatter 86 can handle that data. If there is any mismatching between the data sending rate from the data consuming rate, a software driver may be used to apply stuffing data to a pair of slots in the digital interface 56. One of those slots may include a control word that tells whether the data in the two slots are real data or stuffing data. The formatter 86 may also include a phase locked loop circuit for generating signals of the desired frequencies.

The formatter 86 in some embodiments of the present invention may output the same audio program as the digital to analog converter 80. Alternatively, the formatter 86 may handle a third audio program.

Audio programs may be swapped, on the fly, between the digital to analog converter pair 80 and the digital to analog converter pair 58 by software. Thus, a first channel may be recorded while watching a second channel. One can easily switch to recording the second channel while watching the first channel, without reconnecting cables to external recording peripherals.

In one embodiment of the present invention, the digital link 54 provides stereo pulse code modulated (PCM) signals. The digital to analog converters 58 and 80 may operate at 48 kilohertz.

The mixer 62 may receive signals from the digital to analog converter pair 58 as well as from two pairs of stereo channels 70 and 72 and a pair of monaural channels 74 and 76. The various input channels may be mixed and gain control may be provided. The mixer 62 may output a pair of left and right line out channels 64 and 66 and a monaural output 68. Thus, an output signal may be provided to an output jack for a stereo mix of all sources and a headphone jack, as one example. The line input channels 70, 72, 74 and 76 then receive a variety of analog inputs from external sources. The monaural output 68 may, for example, be utilized by a telephone system. One of the line inputs 70 or 72 may also include a signal from the compact disk player 44.

Figure 3:
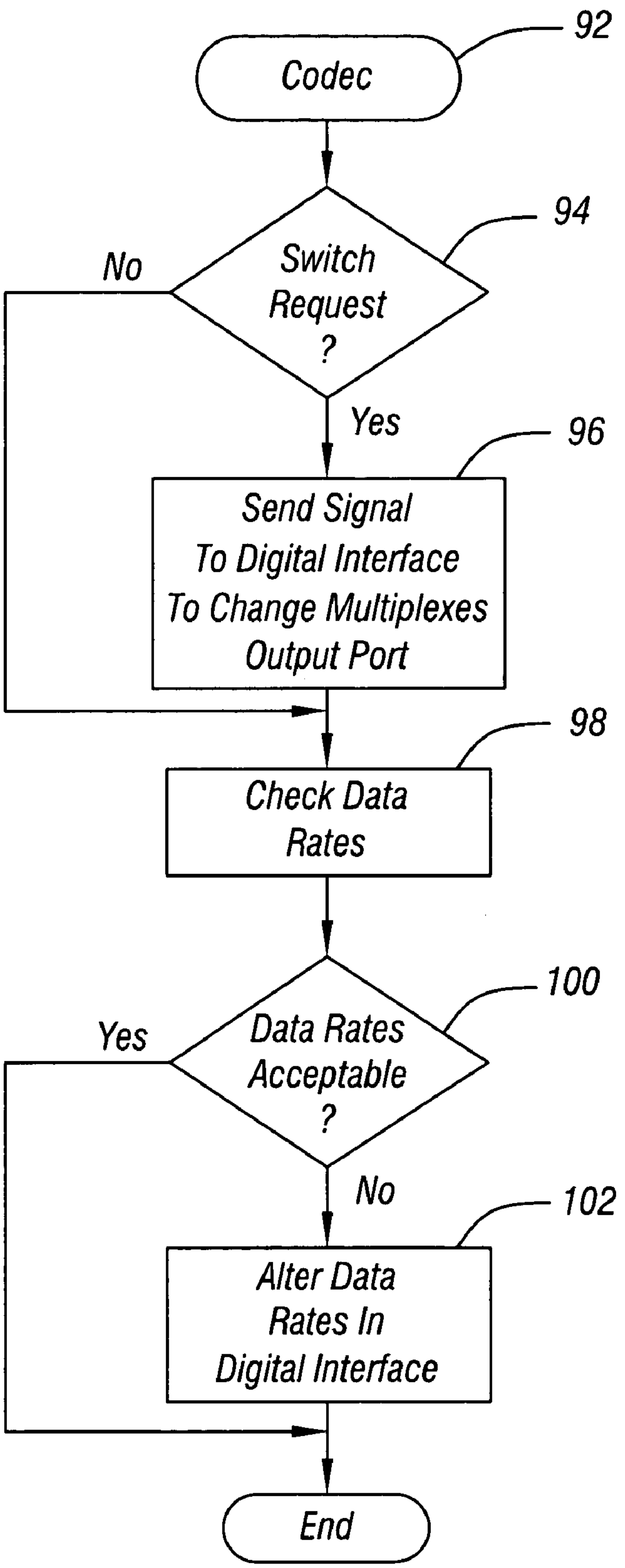
FIG. 3 is a flow chart for software in accordance with one embodiment of the present invention.

The software 92 for controlling the codec 26, in accordance with one embodiment of the present invention is shown in FIG. 3. The software 92 may be stored on the hard disk drive 42 in one embodiment.

Initially, the software 92 checks, at diamond 94, to determine whether a request has been received to switch the output or input ports of the codec 26. For example, if the user is recording a first audio program on the line out 64 and playing a second audio program through the line out 84 to the display 36, the user may thereafter wish to play the program on the line out 64 on the television and record the program on the line out 84. To do this without having to reconnect the peripheral devices to the different line outs, the user may provide an input to the processor-based system 10 through a graphical user interface. The user may request a switch of the information fed to the various outputs. For example, the processor 12 may control the digital interface 56 and its multiplexer to change the data that is fed to the various output ports of the digital interface 56.

Thus, as indicated in FIG. 3, when a switch request is received, as determined in diamond 94, it may cause a signal to be sent to the digital interface 56 to change the multiplexer output ports as indicated in block 96.

If no switch request is received or after implementing a switch request, a check at block 98 determines whether the data rates of the various components connected to the codec 26 are compatible with the codec's data rates. If a peripheral device such as one connected to the S/PDIF formatter 86 output lines 88 and 90 is unable to utilize the data rate provided by the codec 26, as determined in diamond 100, the processor 12 may modify the data rates as indicated in block 102.

The system 10 may determine that the data rates are incompatible in a number of different fashions. In one case, the codec 26 may receive a signal from the processor 12 (or the peripheral device) indicating that the data rate cannot be handled. In another case, the processor 12 may obtain information such as a device ID from each coupled peripheral. Based on a database of available data rates for available components, the processor 12 may determine that the data rate produced by the codec 26 is incompatible with a particular peripheral device.

The data rate may be adjusted in a number of ways. In one case, the data rate maybe adjusted in the digital interface 56. The processor 12 may generate a signal that selects a different data rate for a given port in the digital interface 56. The digital interface 56 may include a plurality of data rates for each of a plurality of output ports.

In another case, the processor 12 may cause the audio accelerator 24 to provide stuffing to effectively decrease the data rate of data provided to a particular port. In still another case, the formatter 86 may be commanded by the processor 12 to slow the data rate, for example by providing stuffing or other conventional means.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A codec comprising:

a digital interface including a first, second, and third pair of stereo channels;

a first pair of digital to analog converters coupled to the first pair of stereo channels;

a second pair of digital to analog converters coupled to the second pair of stereo channels;

a pair of analog mixers each outputting a separate audio program, each of said mixers coupled to one of said first and second pairs of digital to analog converters;

a pair of analog to digital converters coupled to the third stereo channel pair, one of said mixers also coupled to said pair of analog to digital converters; and a device to selectively output a signal from one of said mixers.

2. The codec of claim 1 further including a Sony/Phillips digital interconnect formatter.

3. The codec of claim 1 wherein said digital interface includes a plurality of programmable ports so that the connections from the digital interface to said digital-to-analog converters may be changed.

4. The codec of claim 1 wherein said digital interface has a programmably changeable output data rate.

5. A processor-based system comprising:

a processor; and a codec coupled to said processor, said codec including a digital interface including a plurality of stereo channel pairs, a first pair of digital analog converters coupled to only one of said stereo channel pairs, a second pair of digital-to-analog converters coupled to another one of said stereo channel pairs, a pair of analog mixers each outputting a separate audio program, each of said mixers coupled to only one of said first and second pairs of digital-to-analog converters, and a device to selectively output a signal from one of said mixers.

6. The processor-based system of claim 5 wherein said codec further includes a pair of analog-to-digital converters coupled to another one of said stereo channel pairs, one of said mixers also coupled to said pair of analog-to-digital converters.

7. The processor-based system of claim 6 wherein said system may simultaneously play one audio program while recording another audio program.

8. The system of claim 5 wherein said system can process two separate audio programs at the same time.

9. The processor-based system of claim 5 further including a Sony/Phillips digital interconnect formatter.

10. The processor-based system of claim 5 wherein said digital interface includes a plurality of programmable ports so that the connections from the digital interface to said digital-to-analog converters may be changed.

11. The processor-based system of claim 5 wherein said digital interface has a programmably changeable output data rate.

* * * * *